United States Patent [19]

Gevaud

[11] Patent Number: 5,728,929
[45] Date of Patent: Mar. 17, 1998

[54] INSTALLATION FOR DETECTING THE PRESENCE OF HELIUM IN A FLUID CIRCUIT

[75] Inventor: Roland Gevaud, Argonay, France

[73] Assignee: Alcatel Cit, Paris, France

[21] Appl. No.: 651,748

[22] Filed: May 22, 1996

[30] Foreign Application Priority Data

May 24, 1995 [FR] France .................. 95 06220

[51] Int. Cl.$^6$ ................................. G01M 3/20
[52] U.S. Cl. .................. 73/19.12; 73/40.7; 73/40; 95/53; 96/9
[58] Field of Search .................. 73/19.12, 40, 40.7; 95/45, 53; 96/4, 7, 9

[56] References Cited

U.S. PATENT DOCUMENTS

| | | | |
|---|---|---|---|
| 3,339,341 | 9/1967 | Maxwell et al. | 95/53 |
| 4,294,106 | 10/1981 | Gevaud et al. | 73/40.7 |
| 4,419,882 | 12/1983 | Ishii et al. | 73/40.7 |
| 4,459,844 | 7/1984 | Burkhart | 73/40.7 |
| 4,773,256 | 9/1988 | Saulgeot | 73/40.7 |
| 4,918,975 | 4/1990 | Voss | 73/40.7 |
| 5,022,265 | 6/1991 | Voss | 73/40.7 |
| 5,297,422 | 3/1994 | Baret | 73/40.7 |
| 5,341,671 | 8/1994 | Baret et al. | 73/40.7 |

FOREIGN PATENT DOCUMENTS

| | | | |
|---|---|---|---|
| 0365042 | 4/1990 | European Pat. Off. . | |
| 0534825A1 | 3/1993 | European Pat. Off. . | |
| 534825 | 3/1993 | European Pat. Off. | 73/40.7 |
| 2411024 | 7/1979 | France | 95/45 |
| 2606509 | 5/1988 | France | 73/40.7 |
| 2228427 | 8/1990 | United Kingdom | 95/45 |

*Primary Examiner*—Hezron E. Williams
*Assistant Examiner*—Daniel S. Larkin
*Attorney, Agent, or Firm*—Sughrue, Mion, Zinn, Macpeak & Seas, PLLC

[57] ABSTRACT

An installation for detecting the presence of helium in a fluid circuit, the installation including a tapping member constituting a volume comprising a first internal space and a second internal space separated from each other by a semi-permeable partition through which helium can pass, the first space of said tapping member being inserted in series in the fluid circuit, the second space being connected both to a gas source via an orifice having an adjustable aperture, and also to a pumping member via a pipe, the flow pumped through the pipe conveying the flow under viscous conditions towards a feed member connected to a helium leak detector.

5 Claims, 3 Drawing Sheets

INSTALLATION FOR DETECTING THE PRESENCE OF HELIUM IN A FLUID CIRCUIT

The present invention relates to an installation for detecting the presence of helium in a fluid circuit.

BACKGROUND OF THE INVENTION

It is known that circuits in installations such as chemical, petrochemical, and thermal installations, etc., can be leak tested while they are in operation by injecting helium under pressure into the circuits and by surrounding the portions under test with a casing that is part of a secondary circuit conveying a secondary fluid. In the event that there is a leak in the circuit of the installation in the portions under test, the secondary fluid is "polluted" with helium. The presence of helium in the secondary circuit thus reveals the existence of a leak. A known technique for detecting the presence of helium consists in using a helium-tapping unit having a semi-permeable membrane, which unit essentially consists of a small housing separated internally into two portions by a semi-permeable separator membrane allowing only the helium to pass through it and supported by a porous support. The unit is inserted in a secondary fluid tapping circuit, so that the secondary fluid flows past the semi-permeable membrane, while that portion of the housing which is situated on the other side of the membrane is connected to a helium leak detector.

Another known technique, which amounts to the same thing, is to use a sniffer probe having a semi-permeable membrane and connected to a leak detector. The only differences lie in the facts (1) that the probe does not constitute a housing in two portions internally separated by the membrane, but rather it constitutes a housing "closed" by the membrane, and (2) that in order to cause the fluid in which any helium is to be detected to flow past the membrane, the probe must be inserted into the circuit through which the fluid flows, with a sealing gasket being provided around the probe.

In both cases, the pipe connecting the leak detector to the tapping unit or to the sniffer probe is under a high vacuum, and any helium present flows under molecular conditions. In order to obtain a quick response from the detector, it is therefore essential for the link pipe to be short (2 meters to 3 meters at the very most), and to be of quite large diameter: at least 1 cm. The detector must therefore be close to the circuit under test, but such a circuit is sometimes, and even often, in inaccessible surroundings that are full of piping, or that are even dangerous.

OBJECTS AND SUMMARY OF THE INVENTION

An object of the invention is to mitigate that drawback, and, to this end, the invention provides an installation for detecting the presence of helium in a fluid circuit, said installation including a tapping member constituting a volume comprising a first internal space and a second internal space separated from each other by a semi-permeable partition through which helium can pass, said first space of said tapping member being inserted in series in said fluid circuit, said second space being connected both to a gas source via an orifice having an adjustable aperture, and also to a pumping member via a pipe, the flow pumped through said pipe conveying the flow under viscous conditions towards a feed member connected to a helium leak detector.

In a particular embodiment, said pumping member is a stage of a primary pump that is part of said leak detector, and said feed member is a capsule having a semi-permeable porous wall, which capsule is connected firstly to said pipe and to said pumping member, and secondly to an inlet of said helium leak detector.

BRIEF DESCRIPTION OF THE DRAWINGS

The invention is described below with reference to the accompanying drawings, in which.

MORE DETAILED DESCRIPTION

Figure 1:
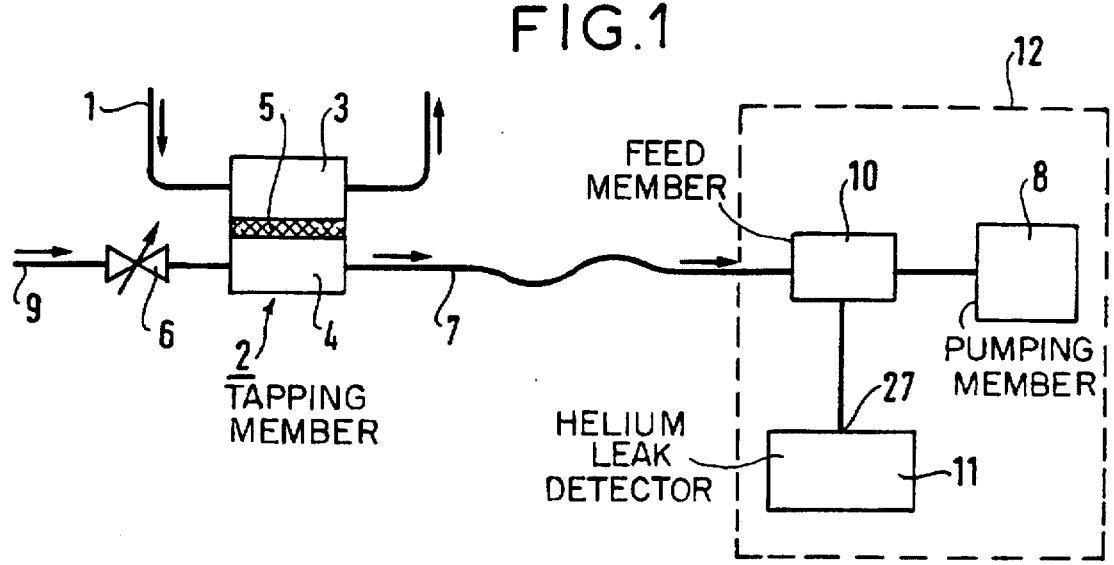
FIG. 1 shows an installation of the invention for detecting the presence of helium in a fluid circuit.

FIG. 1 shows an installation of the invention for detecting the presence of helium in a fluid circuit 1. A tapping member 2 is used for this. Such a member is known per se. For example, it may constitute a volume comprising a first space 3 and a second space 4 separated from each other by a semi-permeable partition 5 through which only the helium can pass. For example, the partition may be composed firstly of a fine separator membrane that is about ten microns thick, and that allows any helium dissolved in the liquid to pass, and secondly of a porous support supporting the membrane.

The first space 3 of the tapping member 2 is inserted in series in the circuit 1. The second space 4 of the tapping member 2 is connected firstly to a carrier gas source via an adjustable-aperture valve 6 (the carrier gas may be merely air, or preferably a gas containing no helium, such as nitrogen, or carbon dioxide), and secondly to a pumping member 8 via a pipe 7. The pipe 7 may be of length in the range of a few meters to a few tens of meters, and it may be of a small inside diameter, i.e. about one millimeter. The pumped flow sucked in at 9 is conveyed under viscous conditions. At the end of pipe 7, the pumped flow passes through a feed member 10 connected to a helium leak detector 11.

For example (FIG. 2), the feed member 10 may be a capsule having a semi-permeable porous wall 26, similar to the tapping member 2, or it may merely be a sniffer probe inserted into a widened portion of the pipe 7. The feed member 10 is connected firstly to the pipe 7 and to the pump 8, and secondly to an inlet 27 of the detector 11.

Thus, in the event that helium is present in the fluid circuit 1, the helium alone passes through the semi-permeable partition 5, and into the second space 4 where it is entrained by and mixed with the carrier gas (air, nitrogen, etc.) which is sucked in at 9 by the pump 8 and which is entrained thereby under viscous conditions. The flow of carrier gas is adjusted by the adjustable valve 6. At the feed member 10, the gas flow is split into two, namely a small fraction which is directed towards the detector 11, and the remaining large fraction which is pumped by the pump 8. Advantageously, the carrier gas sucked in at 9 is not air (which contains helium naturally), but rather it is nitrogen, thereby enabling background noise to be reduced.

Figure 2:
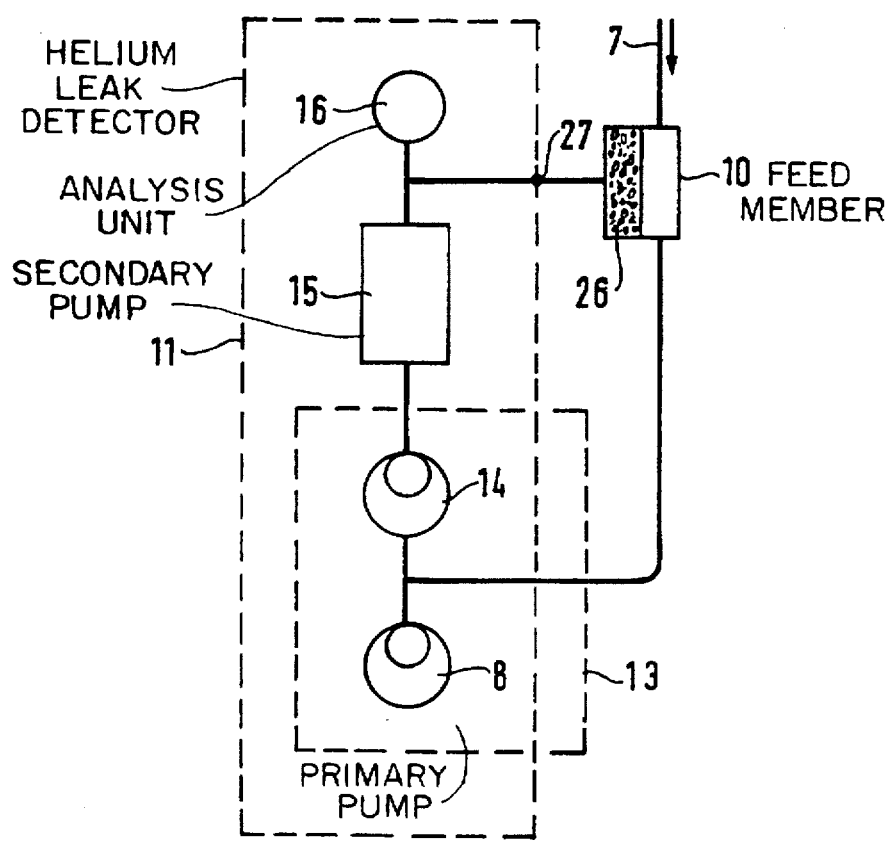
FIG. 2 is a detail of a portion of FIG. 1 in a particular embodiment.

Advantageously, the pump 8 is part of the pumping system of the detector itself, as shown in FIG. 2 which shows a preferred embodiment of all of the elements grouped together inside box 12 of FIG. 1.

The pipe 7 leading to the feed member 10 is also shown. At the feed member, the majority of the gas flow is pumped at high speed by the high-pressure stage 8 of the primary pumping set 13 comprising two vane pumps 14 and 8 connected together in series.

A small fraction of the flow entering the feed member 10 is sucked in by the detector pumping set comprising a secondary pump 15 and the primary pumping set 13. An analysis unit 16 is connected to the inlet of the secondary pump 15.

Thus, by means of the invention, the assembly 12 can be situated a long way from the circuit 1 to be tested, and any helium present in the circuit and passing through the partition 5 is entrained by the carrier gas flow sucked in at 9, and it is conveyed quickly under viscous conditions to the feed member 10 of the detector. The pipe 7 can be very long, as indicated above.

Figure 3:
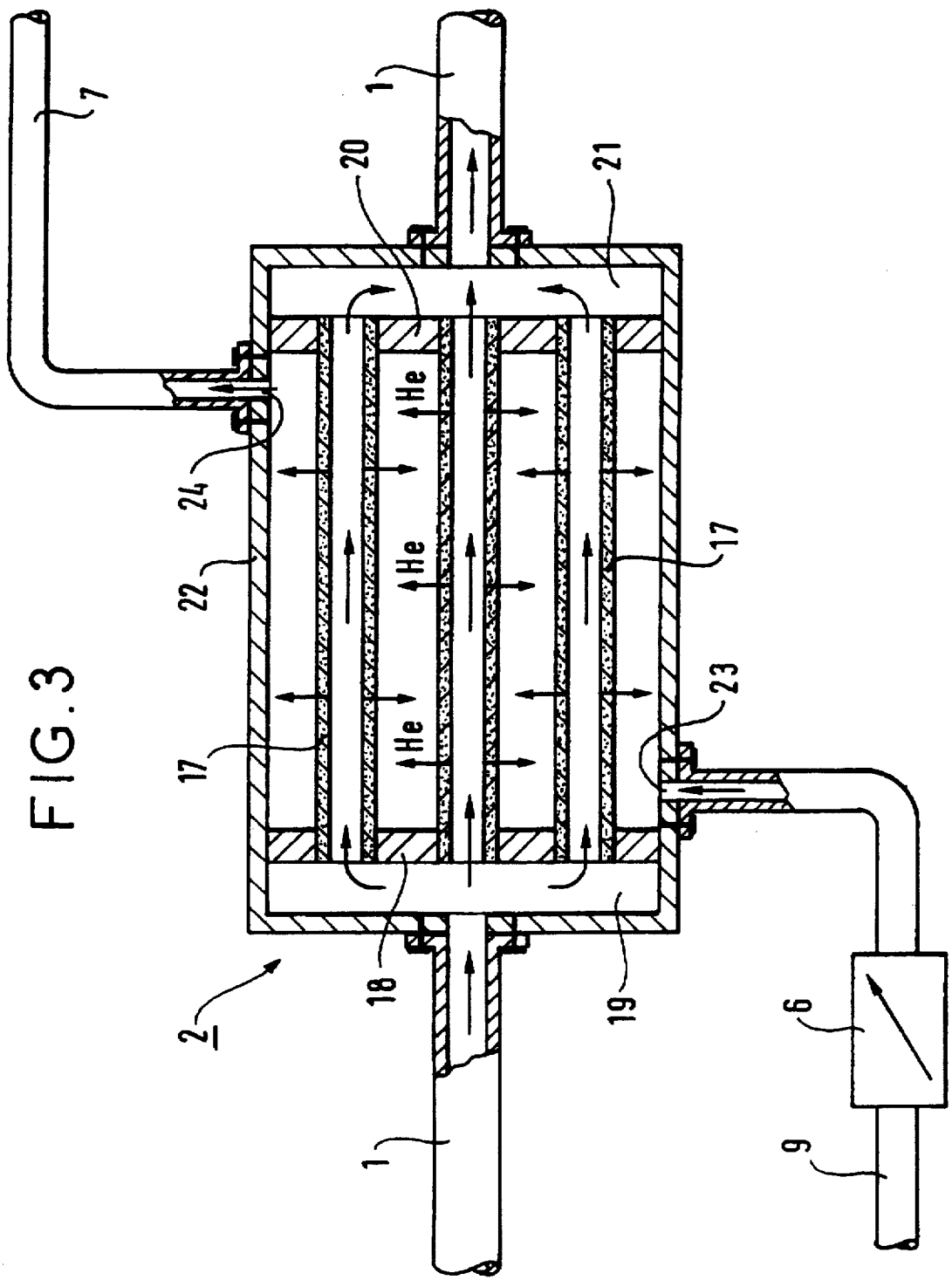
FIG. 3 shows a tapping member of the invention in a particular embodiment.

FIG. 3 shows a variant embodiment of the tapping member 2 increasing the surface area of the separator membranes, and thus enabling a larger quantity of helium to pass through the membranes, thereby increasing the flow of helium entrained by the carrier gas, and thus increasing sensitivity.

The tapping member in this variant includes porous tubes 17, each of which serves to support a semi-permeable membrane. The tubes are disposed mutually parallel and are connected at one end to a first tube plate 18 associated with an inlet manifold 19, and at the other end in the same way to a second tube plate 20 associated with an outlet manifold 21. An external casing 22 encloses the tubes 17 by interconnecting the two tube plates 18 and 20. The casing 22 is provided with an inlet orifice 23 intended to be connected to a carrier gas source, and with an outlet orifice 24 connected to the pipe 7.

The inlet and outlet manifolds 19 and 21 are connected to the fluid circuit 1 to be tested.

Figure 4:
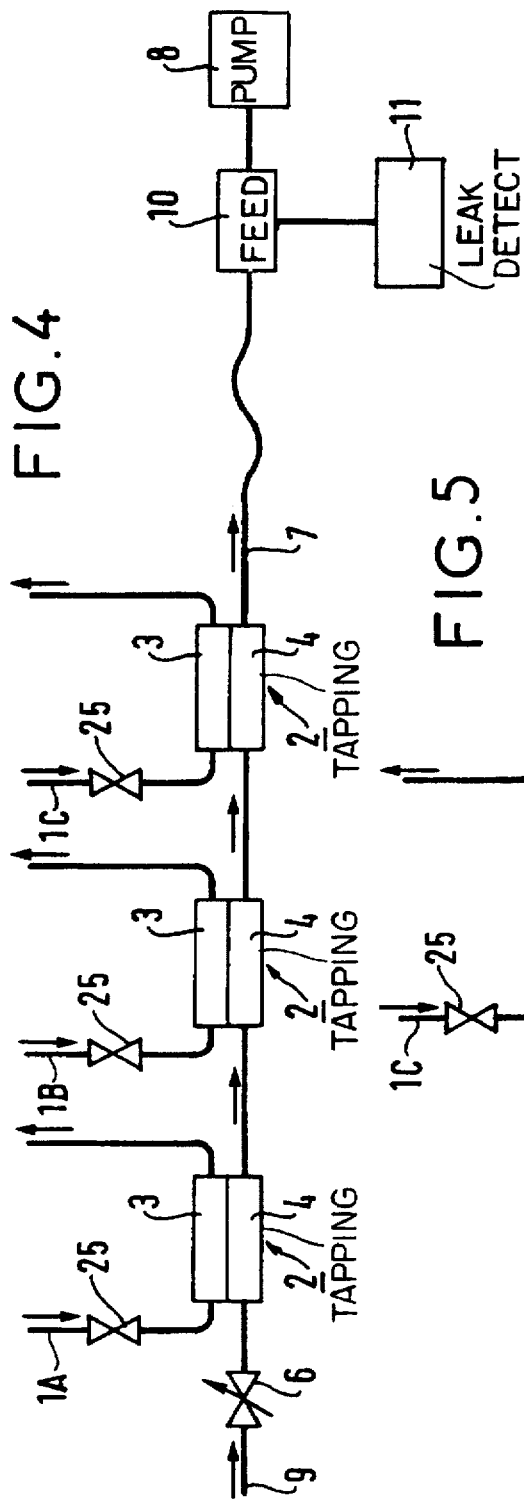
FIG. 4 shows an installation of the invention in which a plurality of tapping members are associated together in series so as to make it possible to test a plurality of fluid circuits.

FIG. 4 shows an installation in which a plurality of tapping members 2 are associated together in series, making it possible to test a plurality of distinct fluid circuits 1A, 1B, 1C. Each of the circuits is equipped with a valve 25 enabling measurement to be performed successively.

Figure 5:
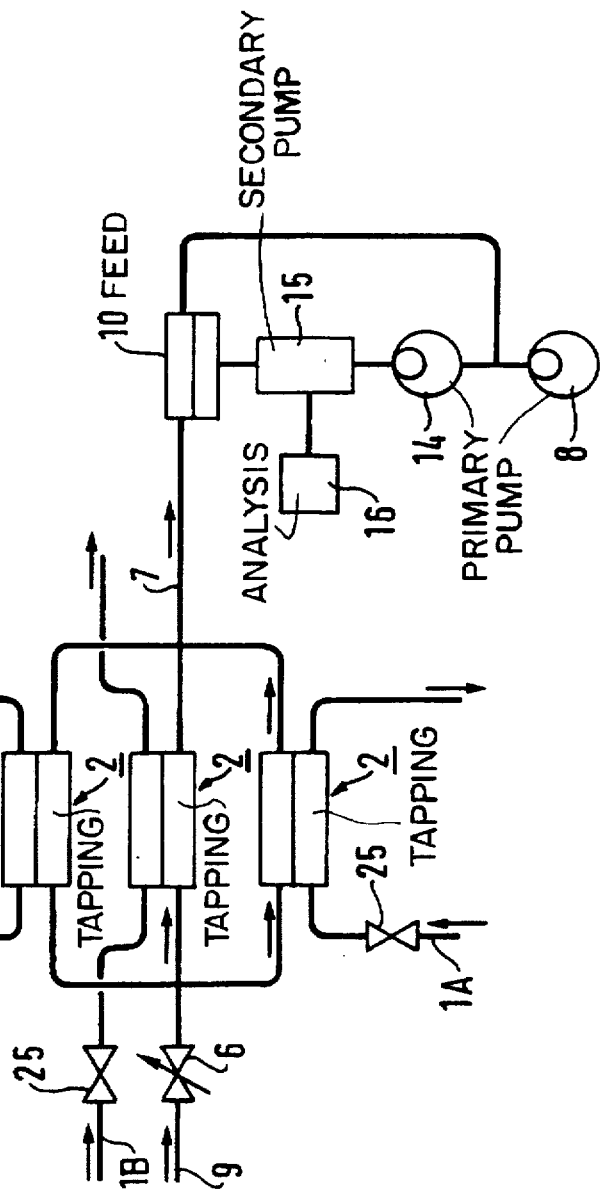
FIG. 5 is a variant on the installation shown in FIG. 4, in which variant the various tapping members are disposed in parallel.

FIG. 5 is a variant on FIG. 4, in which variant the tapping members 2 are associated together in parallel. In FIG. 5, the detection members are shown in the same detail as they are in FIG. 2.

What is claimed is:

1. An installation for detecting the presence of helium in a fluid circuit, said installation including a tapping member constituting a volume comprising a first internal space and a second internal space separated from each other by a semi-permeable partition through which helium can pass, said first space of said tapping member being inserted in series in said fluid circuit, said second space being connected both to a gas source via an orifice having an adjustable aperture, and also to a pumping member via a pipe, the flow pumped through said pipe conveying the flow under viscous conditions towards a feed member connected to a helium leak detector.

2. An installation according to claim 1, wherein said pumping member is a stage of a primary pump that is part of said helium leak detector.

3. An installation according to claim 1, wherein said feed member is a capsule having a semi-permeable porous wall, which capsule is connected firstly to said pipe and to said pumping member, and secondly to an inlet of said helium leak detector.

4. An installation according to claim 1, wherein said tapping member comprises a plurality of porous tubes, each of which serves to support a semi-permeable membrane, the tubes being disposed parallel to one another and being connected at one end to a first tube plate associated with an inlet manifold and at the other end to a second tube plate associated with an outlet manifold, an outer casing interconnecting the two tube plates, enclosing the tubes, and being provided with an inlet orifice and an outlet orifice.

5. An installation according to claim 1, wherein said installation includes a plurality of tapping members arranged in series or in parallel, and wherein said first space of each of said n tapping members is inserted in a specific fluid circuit to be tested.

* * * * *